US008780366B2

(12) United States Patent
Kim et al.

(10) Patent No.: US 8,780,366 B2
(45) Date of Patent: Jul. 15, 2014

(54) IMAGE FORMING APPARATUS AND IMAGE FORMING OPTION SETTING METHOD THEREOF TO DISPLAY AN ADMINISTRATOR SETTING OPTION HAVING A CORRELATION WITH THE DISPLAYED USER SETTING OPTION ACCORDING TO THE SELECTED ADMINISTRATOR SETTING

(75) Inventors: Hyun-sun Kim, Hwaseong-si (KR); Hyun-cheol Park, Anyang-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 904 days.

(21) Appl. No.: 12/273,684

(22) Filed: Nov. 19, 2008

(65) Prior Publication Data

US 2009/0147281 A1 Jun. 11, 2009

(30) Foreign Application Priority Data

Dec. 6, 2007 (KR) .................. 10-2007-0126425

(51) Int. Cl.
*H04N 1/60* (2006.01)
*G06F 3/12* (2006.01)

(52) U.S. Cl.
USPC ..................................... 358/1.13

(58) Field of Classification Search
USPC ............................... 358/1.13, 1.15
See application file for complete search history.

(56) References Cited

U.S. PATENT DOCUMENTS

| 2002/0093682 A1* | 7/2002 | Nakajima | 358/1.16 |
|---|---|---|---|
| 2005/0086209 A1* | 4/2005 | Chou | 707/3 |
| 2007/0283019 A1* | 12/2007 | Funahashi | 709/226 |
| 2008/0231884 A1* | 9/2008 | Okazaki | 358/1.15 |

FOREIGN PATENT DOCUMENTS

| JP | 2006-237953 | 9/2006 |
|---|---|---|
| KR | 1020060003606 | 1/2006 |
| KR | 1020060099786 | 9/2006 |
| KR | 20060120955 | 11/2006 |
| KR | 10-2007-0078583 | 8/2007 |

OTHER PUBLICATIONS

Korean Office Action Issued on Mar. 21, 2012 in KR Patent Application No. 10-2007-0126425.
Korean Notice of Allowance dated Mar. 26, 2013 issued in Korean Application No. 10-2007-0126425.

* cited by examiner

*Primary Examiner* — Qian Yang
(74) *Attorney, Agent, or Firm* — Stanzione & Kim, LLP (57) ABSTRACT

An image forming option setting method of an image forming apparatus which has a display unit, the method includes selecting an administrator setting, and displaying an administrator setting image forming option on the display unit related to a display image forming option displayed on the display unit when the administrator setting is selected.

19 Claims, 7 Drawing Sheets

| Main | 1Depth | 2Depth | 3Depth | 4Depth | 5Depth | 6Depth |
|---|---|---|---|---|---|---|
| General | Device Info | Service Center Registration | Phone Number | Phone Number | Phone Number | Phone Number |
| | | | E-mail Address | | | |
| | | Contact Info | Using Place | | | |
| | | | Phone Number | | | |
| | Date & Time | Set Date & Time | Year,Month,Day Hour,Date | | | |
| | | Date Format | MM/DD/YY YY/MM/DD DD/MM/YY | | | |
| | | Time Format | 12 Hour 24 Hour | | | |
| | Default Settings | Default Window | Home | | | |
| | | | Copy | | | |
| | | | ID Copy | | | |
| | | | Fax | | | |
| | | Default Option | Home Window | ID Card Copy | Enable/Disable | |
| | | | Copy | Output | Collated Uncollated Staple,Portrait Staple,Landscape | |
| | | | | Reduce/ Enlarge | Original(100%) Custom Auto Fit LGL→LTR(78%) LGL→A4(83%) A4→A5(71%) A4→LTR(94%) A5→A4(141%) EXE->LTR(104%) 25% 50% 150% 200% 400% | |
| | | | | Duplex | 1→1 Sided 1→2 Sided 1→2 Sided 1→2 Sided, Rotate Side 2 2→1 Sided 2→2 Sided 2→1 Sided, Rotate Side 2 | |

IMAGE FORMING APPARATUS AND IMAGE FORMING OPTION SETTING METHOD THEREOF TO DISPLAY AN ADMINISTRATOR SETTING OPTION HAVING A CORRELATION WITH THE DISPLAYED USER SETTING OPTION ACCORDING TO THE SELECTED ADMINISTRATOR SETTING

CROSS-REFERENCE TO RELATED APPLICATIONS

This application claims priority under 35 U.S.C. §119(a) from Korean Patent Application No. 10-2007-0126425, filed on Dec. 6, 2007 in the Korean Intellectual Property Office, the disclosure of which is incorporated herein in its entirety by reference.

BACKGROUND OF THE INVENTION

1. Field of the Invention

The present general inventive concept relates to an image forming apparatus and an image forming option setting method thereof, and more particularly, to an image forming apparatus which easily searches and sets an administrator setting image forming option related to a user setting image forming option displayed on a display unit, and an image forming option setting method thereof.

2. Description of the Related Art

An image forming apparatus forms an image on a print medium with image data through a developer or ink. The image forming apparatus may be classified as a printer, a photocopier, a facsimile, a scanner and the like depending on functions. With the recent advancement in technology, a multi function device having a plurality of functions has continued to be developed.

The conventional image forming apparatus has image forming options with respect to functions, which can be changed by a user. The image forming options are divided into a user setting in which a user changes the options and an administrator setting in which only an authorized administrator changes the options. Here, the image forming options include size of print media, density of print, power saving mode-entering time, a security function and the like which are necessary for using the image forming apparatus.

Even though correlation exists in some cases, the user setting image forming options and the administrator setting image forming options are managed independently. Also, the administrator setting image forming options are mainly stored as a hierarchical structure according to upper and lower levels. Thus, a user goes through complicated steps to change the image forming options as desired.

For example, if a user is to change fax-related image forming options in the administrator setting like in the user setting, the conventional image forming apparatus changes into the fax-related image forming options from a top level route of the image forming options and then sequentially changes into a lower level route. That is, selecting the desired image forming options takes a lot of time.

The administrator setting image forming options are changed only through the route. Thus, if a user is to change second image forming options after selecting the desired image forming options, the user should change the image forming options from the lower level route to the top level route and then access the second image forming options.

SUMMARY OF THE INVENTION

The present general inventive concept provides an image forming apparatus to display administrator setting image forming options based on user setting image forming options when the image forming options are changed from the user setting to the administrator setting, to thereby reduce user's inconveniences, and an image forming option setting method thereof.

Additional aspects and utilities of the present general inventive concept will be set forth in part in the description which follows and, in part, will be obvious from the description, or may be learned by practice of the general inventive concept.

The foregoing and/or other aspects of the present general inventive concept can be achieved by providing an image forming option setting method of an image forming apparatus which has a display unit, the method comprising selecting an administrator setting, and displaying an administrator setting image forming option on the display unit related to a display image forming option displayed on the display unit when the administrator setting is selected.

The method may further comprise searching a related image forming option related to the display image forming option from a plurality of administrator setting image forming options.

The method may further comprise displaying a setting environment of the selected related image forming option if the searched related administrator setting image forming options are plural and one of the plurality of related image forming options is selected.

If the searched related administrator setting image forming option may be singular, a setting environment of the searched related image forming option is directly displayed.

The searching the related image forming option may comprise searching the related image forming option based on a keyword included in the display image forming option.

The searching the related image forming option may comprise searching the related image forming option based on relevance to the selected image forming option.

The searched related image forming options may be displayed together if the related image forming options are plural.

The related image forming options may be displayed regardless of a hierarchical structure if the administrator setting image forming options are stored as the hierarchical structure.

The foregoing and/or other aspects of the present general inventive concept can also be achieved by providing an image forming apparatus which sets an image forming option, the image forming apparatus comprising a display unit to display the image forming option thereon, an input unit to receive an image forming option setting signal with respect to one of a user setting and an administrator setting of the displayed image forming option, a storage unit to store therein a user setting image forming option and an administrator setting image forming option, and a controller to search the administrator setting image forming option related to a display image forming option in the user setting displayed on the display unit if the administrator setting is selected through the input unit, and controls the display unit to display the searched related image forming option.

The storage unit may store keywords of the user setting image forming option and the administrator setting image forming option, and the controller may search the related image forming option based on the keywords included in the display image forming option.

The storage unit may store a correlation between the user setting image forming option and the administrator setting image forming option, and the controller may search the related image forming option based on a relevance to the display image forming option.

The controller may control the display unit to display all the plurality of related image forming options if the searched related image forming options are plural.

The controller may control the display unit to display a setting environment of the selected related image forming option if one of the plurality of related image forming options is selected.

The controller may control the display unit to display a setting environment of the related image forming option if the related image forming option is singular based on a search result.

The foregoing and/or other aspects and utilities of the general inventive concept may also be achieved by providing an image forming apparatus including a display unit to display a user interface including a user setting image forming option and one or more other user interfaces, and a controller to search an image forming option corresponding to a selected user setting image forming option, and to control the display unit to display the searched related image forming option through the one or more other user interfaces, wherein the user interface and the one or more other user interfaces are displayed at a same time on a screen of the display unit.

The foregoing and/or other aspects and utilities of the general inventive concept may also be achieved by providing an image forming apparatus including a display unit to display a user interface including a user setting image forming option and one or more other user interfaces, and a controller to search an image forming option corresponding to a selected user setting image forming option, and to control the display unit to display the searched related image forming option through the one or more other user interfaces, wherein both the user interface and the one or more other user interfaces are displayed without regard to a hierarchical structure on a screen of the display unit.

The foregoing and/or other aspects and utilities of the general inventive concept may also be achieved by providing a control method of an image forming apparatus, the control method including displaying a user interface including a user setting image forming option and one or more other user interfaces by a display unit, searching an image forming option corresponding to a selected user setting image forming option, and controlling the display unit to display the searched related image forming option through the one or more other user interfaces such that the user interface and the one or more other user interfaces are displayed at a same time.

The foregoing and/or other aspects and utilities of the general inventive concept may also be achieved by providing a computer-readable recording medium having embodied thereon a computer program to execute a method, wherein the method including displaying a user interface including a user setting image forming option and one or more other user interfaces by a display unit, searching an image forming option corresponding to a selected user setting image forming option, and controlling the display unit to display the searched related image forming option through the one or more other user interfaces such that the user interface and the one or more other user interfaces are displayed at a same time.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to like elements throughout. The embodiments are described below so as to explain the present general inventive concept by referring to the figures.

Figure 1:
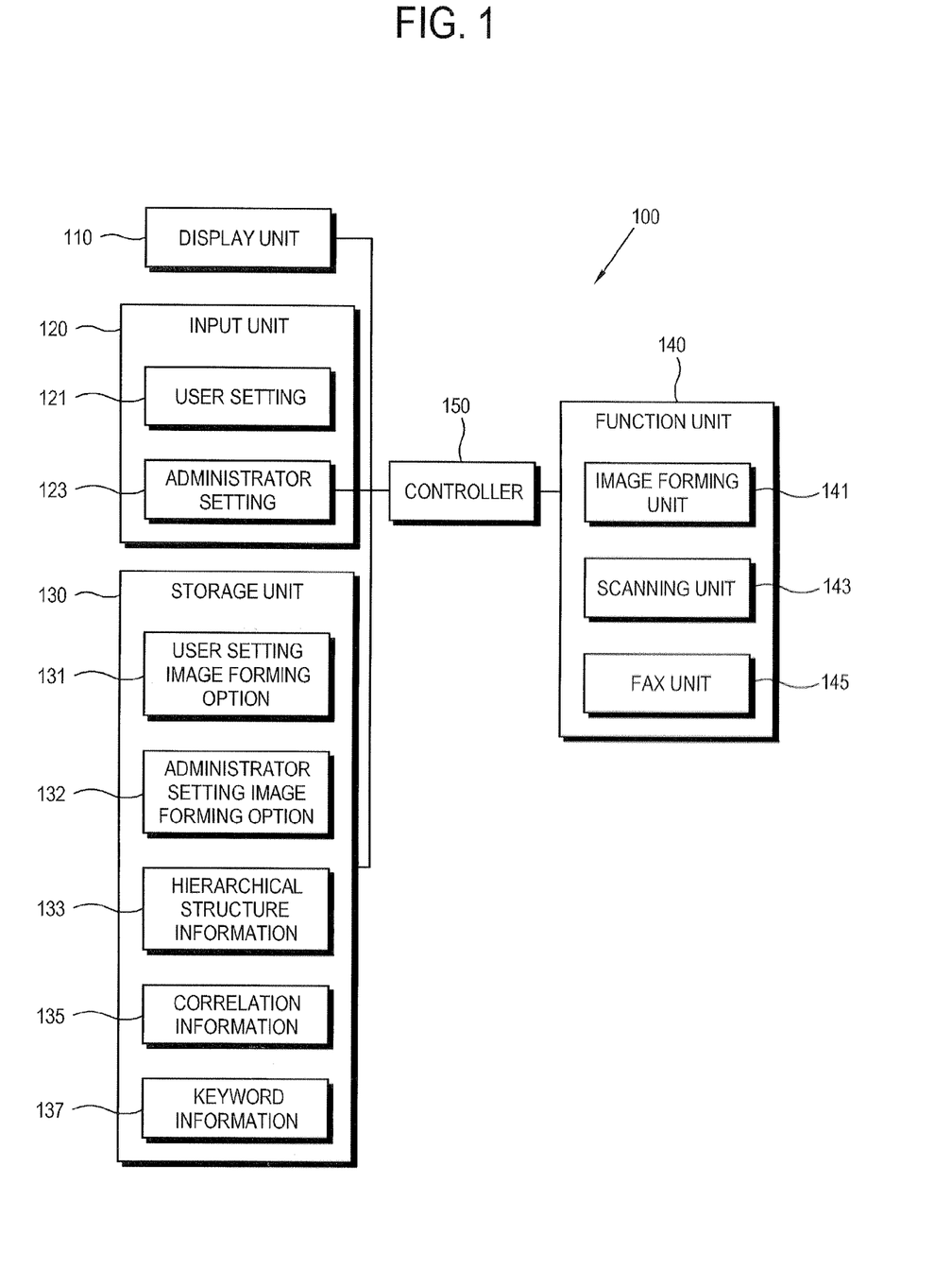
FIG. 1 is a block diagram illustrating an image forming apparatus according to an embodiment of the present general inventive concept.

As illustrated in FIG. 1, an image forming apparatus 100 according to an exemplary embodiment of the present general inventive concept includes a display unit 110, an input unit 120, a storage unit 130, a function unit 140 and a controller 150 to control the foregoing elements.

Figure 2A:
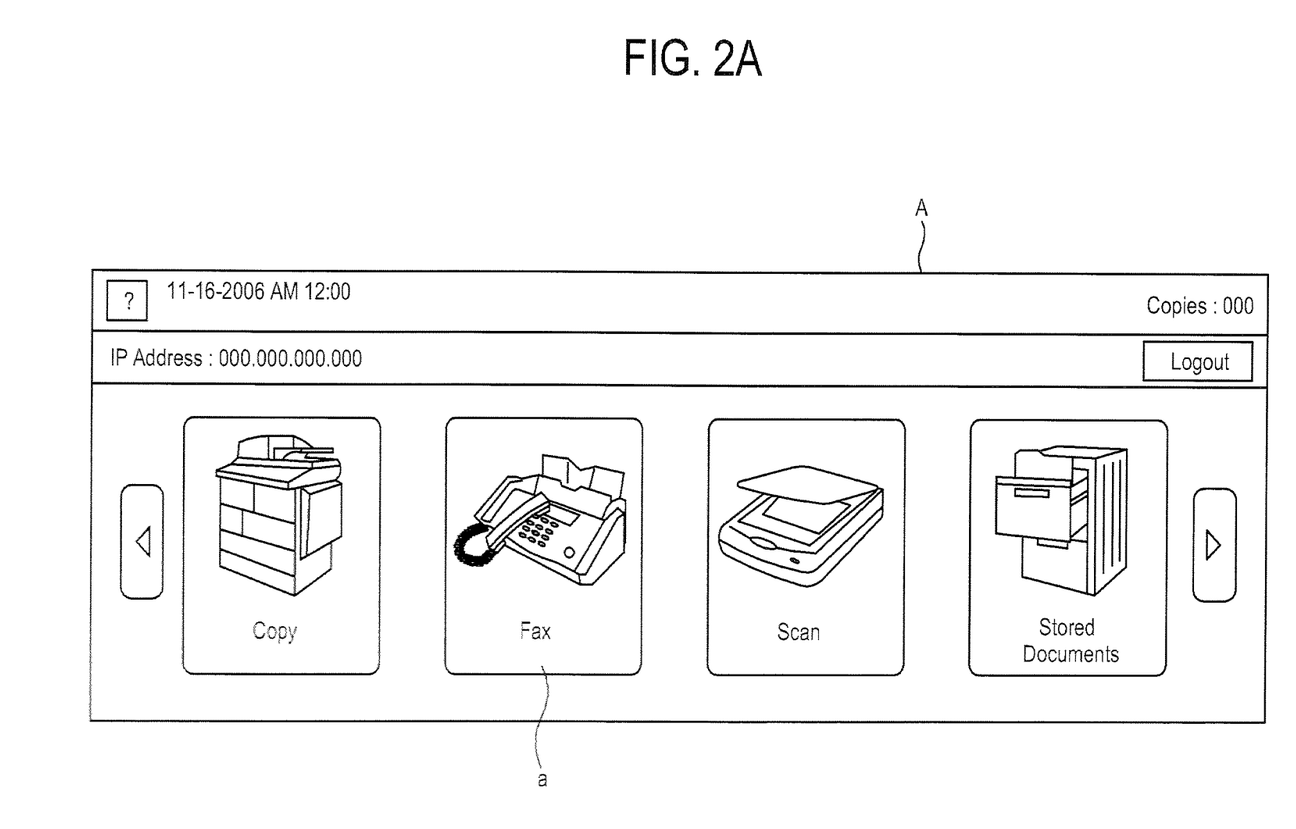
FIGS. 2A and 2B illustrate examples of user setting image forming options.
Figure 2B:
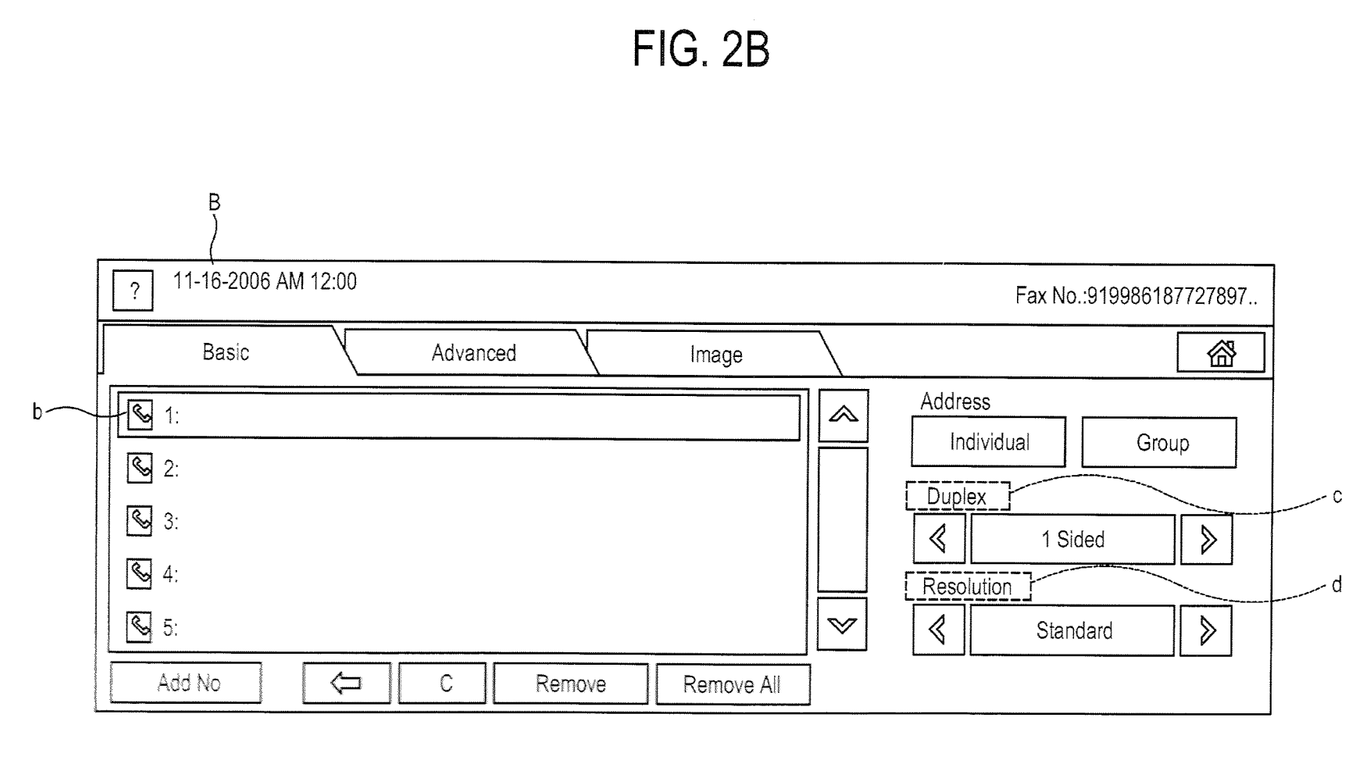

The display unit 110 is provided in an external side of the image forming apparatus 100, and displays an operation status and image forming options of the image forming apparatus 100. The display unit 110 displays user setting image forming options or administrator setting image forming options according to a user's selection. The display unit 110 may display functions of the image forming apparatus 100, and display a plurality of image forming options about the functions, as an image or a character, or as a list as illustrated in FIG. 2. The display unit 110 may display the plurality of image forming options by dividing the plurality of image forming options in a spatial manner or display the plurality of image forming options sequentially in a time division manner. The display method of the display unit 110 may be changed through the image forming options.

The input unit 120 receives an input signal from a user. The input unit 120 is used to input a desired image forming function or input a changing signal of the image forming options with respect to each image forming function. The input unit 120 receives the changing signal with respect to the image forming options for a user setting 121 and an administrator setting 123, respectively.

The input unit 120 may include a plurality of input buttons. The input unit 120 may further include a hot key to receive an administrator setting changing signal.

The input unit 120 may receive an image forming option setting signal through the display unit 110 if the display unit 110 includes a touch screen function.

The storage unit 130 stores therein a plurality of user setting image forming options 131, a plurality of administrator setting image forming options 132, hierarchical structure information 133 about the user setting image forming options 131 and the administrator setting image forming options 132, correlation information 135 between the user setting image forming options 131 and the administrator setting image forming options 132, and keyword information 137 about each of the image forming options.

The user setting image forming options 131 include necessary setting environment for functions of the image forming apparatus 100. For example, if a user selects a fax function from a main screen of a user interface as illustrated in FIG. 2A, the main screen may be changed into the user setting image forming options 131 as illustrated in FIG. 2B. As illustrated therein, the user setting image forming options 131 may include a sender's fax no., a reception fax no., a fax number list b including one or more receiver's fax nos., duplex c, resolution d and the like necessary to perform the fax function. The user setting image forming options 131 may vary depending on an image forming function and a process capacity of the image forming apparatus 100.

Figure 3:
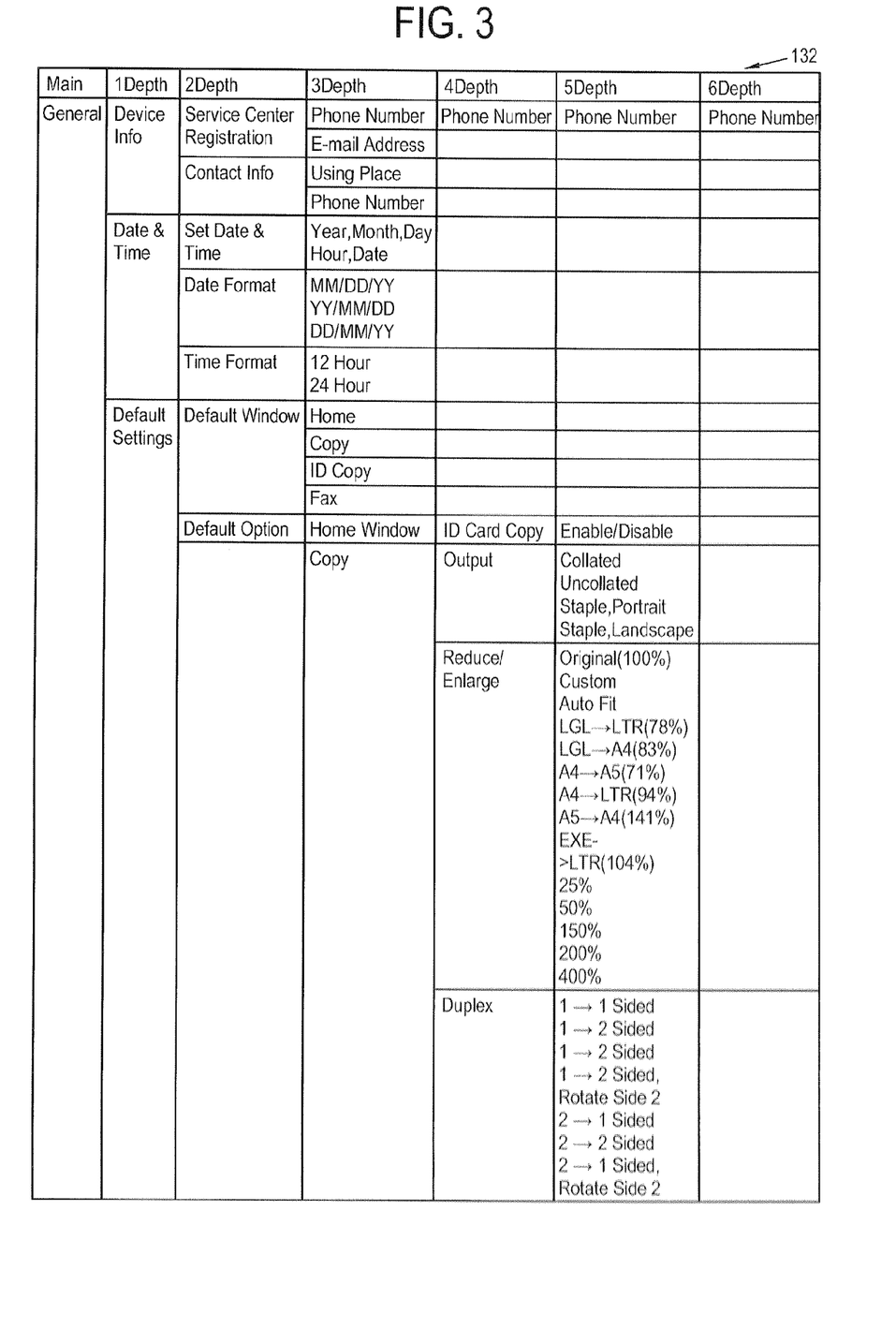
FIG. 3 is a menu map as an example of administrator setting image forming options according to an embodiment of the present general inventive concept.

The administrator setting image forming options 132 include a setting environment of the image forming apparatus 100. FIG. 3 is a menu map as an example of various administrator setting image forming options 132. As illustrated therein, the image forming options are plurally provided, and offer different functions.

Referring to FIGS. 1 and 3, the hierarchical structure information 133 includes a hierarchical structure between the plurality of user setting image forming options 131 stored in the storage unit 130. As illustrated in FIG. 3, the hierarchical structure information 133 includes an upper and lower level structure illustrated as a depth between the plurality of image forming options 131. The hierarchical structure information 133 is classified in a broadest sense depending on functions of the administrator setting image forming options 132, and refers to more specific image forming options in lower depths.

The hierarchical structure information 133 may be used to select desired image forming options through the display unit 110.

The correlation information 135 includes information about a correlation between the user setting image forming options 131 and the administrator setting image forming options 132. That is, the correlation information 135 refers to a correlation of the administrator setting image forming options 132 with respect to the user setting image forming options 131. That is, the fax function of the user setting image forming options 131 is closely related to that of the administrator setting image forming options 132 may be stored. The correlation information 135 may be stored as a default during a manufacturing process, changed or generated again through the image forming options for user's conveniences.

The keyword information 137 includes keywords to recognize each of the image forming options. The keywords may include at least a portion of a text included in names of each image forming options 131 or refer to functions of the image forming options 131. Here, a single image forming option may have a plurality of keywords.

The function unit 140 performs various functions according to a signal input through the input unit 120. An image forming unit 141 forms an image on a print medium with image data supplied by a host device (not illustrated) or image data generated by a scanning unit 143. The scanning unit 143 reads a document and generates image data therefrom. A fax unit 145 transmits and receives the image data generated by the scanning unit 143 with the image forming apparatus 100 that is spaced therefrom.

If a user selects the administrator setting 123 while changing the image forming options through the user setting 121, the controller 150 searches the related image forming options of the administrator setting image forming options 132 based on display image forming options currently displayed on the display unit 110 through the user setting 121, and controls the display unit 110 to display the searched related image forming options.

The controller 150 searches the image forming options related to the display image forming options displayed on the display unit 110 from the administrator setting image forming options 132 when a user selects the administrator setting 123. The controller 150 searches the related image forming options with the keyword information 137 of the display image forming options or with the correlation information 135.

The controller 150 does not consider the hierarchical structure information 133 between the related image forming options when searching the related image forming options from the plurality of administrator setting image forming options 132. Thus, the related image forming options searched by the controller 150 may be displayed in parallel instead of in a hierarchical structure as illustrated in FIG. 3. A user may determine the plurality of related image forming options related to the display image forming options through the display unit 110 at the same time.

If searching the related image forming options through keywords, the controller 150 determines the keyword of the display image forming options and searches the related image forming options including the keyword, based on the administrator setting image forming options 132 and the keyword information 137.

If searching the related image forming options through the correlation information 135 the controller 150 searches the related image forming options corresponding to the display image forming options through the correlation information 135, and controls the display unit 110 to display the searched related image forming options.

A user may determine whether to use the keyword information 137 or the correlation information 135 first or to use one of the keyword information 137 or the correlation information 135 in searching the image forming options.

The controller 150 may control to display the related image forming options searched by the keyword and the correlation, on a single screen of the display unit 110 or control to display the related image forming options, separately. If the plurality of related image forming options is displayed, a search standard may be displayed together so that a user recognizes whether the related image forming options are searched by the keyword or the correlation.

If the searched related image forming options are plural, the controller 150 may control the display unit 110 to filter the image forming options according to a predetermined standard and display the image forming options according to a priority. The searched related image forming options may be filtered based on at least one of selection numbers of a user, display numbers, correlation, level of importance, etc.

If the searched related image forming options are displayed on the display unit 110 and a user selects one of the searched related image forming options, the controller 150 may control the display unit 110 to display the selected related image forming option according to the same process as that described above.

The controller 150 may display a return icon on the display unit 110 to return from the related image forming options to the top level administrator setting image forming options 132. If a user completes determination or change in the related image forming options, the display unit 110 returns to an initial screen to thereby change other image forming options or select a desired image forming function.

Figure 4:
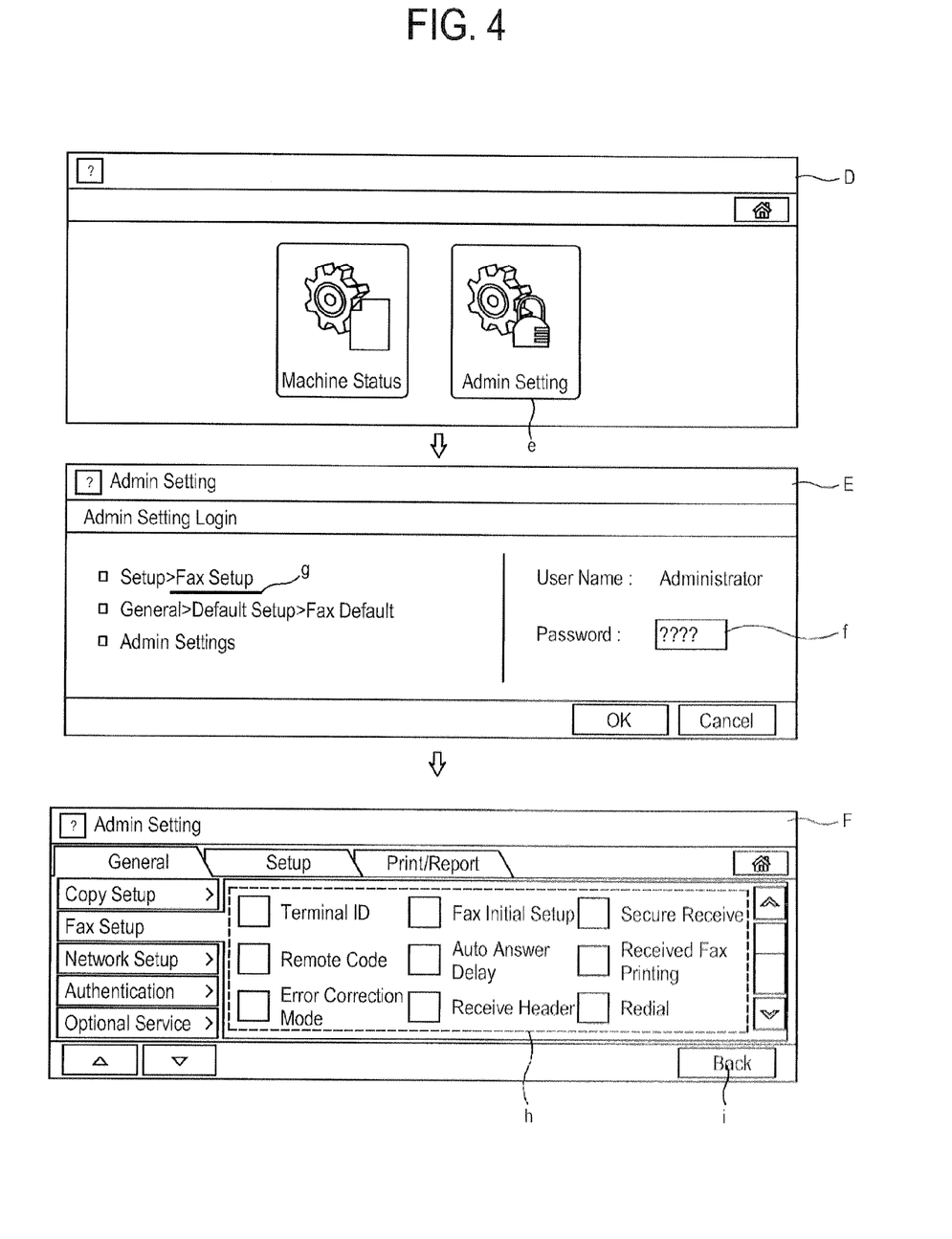
FIG. 4 illustrates an example of an image forming option setting process in the administrator setting according to an exemplary embodiment of the present general inventive concept.

With the foregoing configuration, an image forming option setting method of the image forming apparatus 100 according to an embodiment of the present general inventive concept will be described with reference to FIGS. 4 to 6.

Referring to FIGS. 1, 2A, 2B and 6, a user selects a desired image forming function through a main UI A of FIG. 2A displayed on the display unit 110. For convenience, it is assumed that a user has selected a fax function a.

If the fax function a is selected, a UI B of FIG. 2B corresponding to the user setting image forming options is displayed on the display unit 110 (operation S110). The displayed UI is an example for conveniences and the UI may vary.

A user selects or inputs the image forming options based on the fax function image forming option UI B displayed on the display unit 110. That is, a user may input the receiver's fax number b, duplex c, resolution d and the like.

If a user selects the administrator setting e from the second UI D, the controller 150 determines which display image forming options are currently displayed on the display unit 110 (operation S120). For example, the display image forming options displayed on the display unit 110 include the fax function as illustrated in FIG. 2B.

If a determination is made what the display image forming options is, the controller 150 searches image forming options related to the display image forming options of the administrator setting image forming options 132 stored in the storage unit 130 (operation S130). For example, if the display image forming options displayed on the display unit 110 is the fax function as illustrated in FIG. 2B, the controller 150 searches an image forming option g related to the fax function and controls the display unit 110 to display a third UI E in FIG. 4, which illustrates the searched image forming option g. In addition, the third UI E may further comprise a password input box f to determine whether he/she is authorized to set the administrator setting 123.

The controller 150 searches the related image forming options with the correlation information 135 and the keyword information 137. The controller 150 displays the search result of the related image forming option h on the display unit 110 as illustrated in a fourth UI F of FIG. 5 (operation S140). If a user selects one of the plurality of related image forming options h, the screen is changed into a setting screen to change the selected related image forming option h, for example, as illustrated in FIG. 5.

If the searched related image forming option h is singular, the controller 150 controls the display unit 110 to display a setting screen to change the related image forming option h instead of displaying the related image forming options. Thus, a user eliminates unnecessary processes to reduce setting time.

Figure 5:
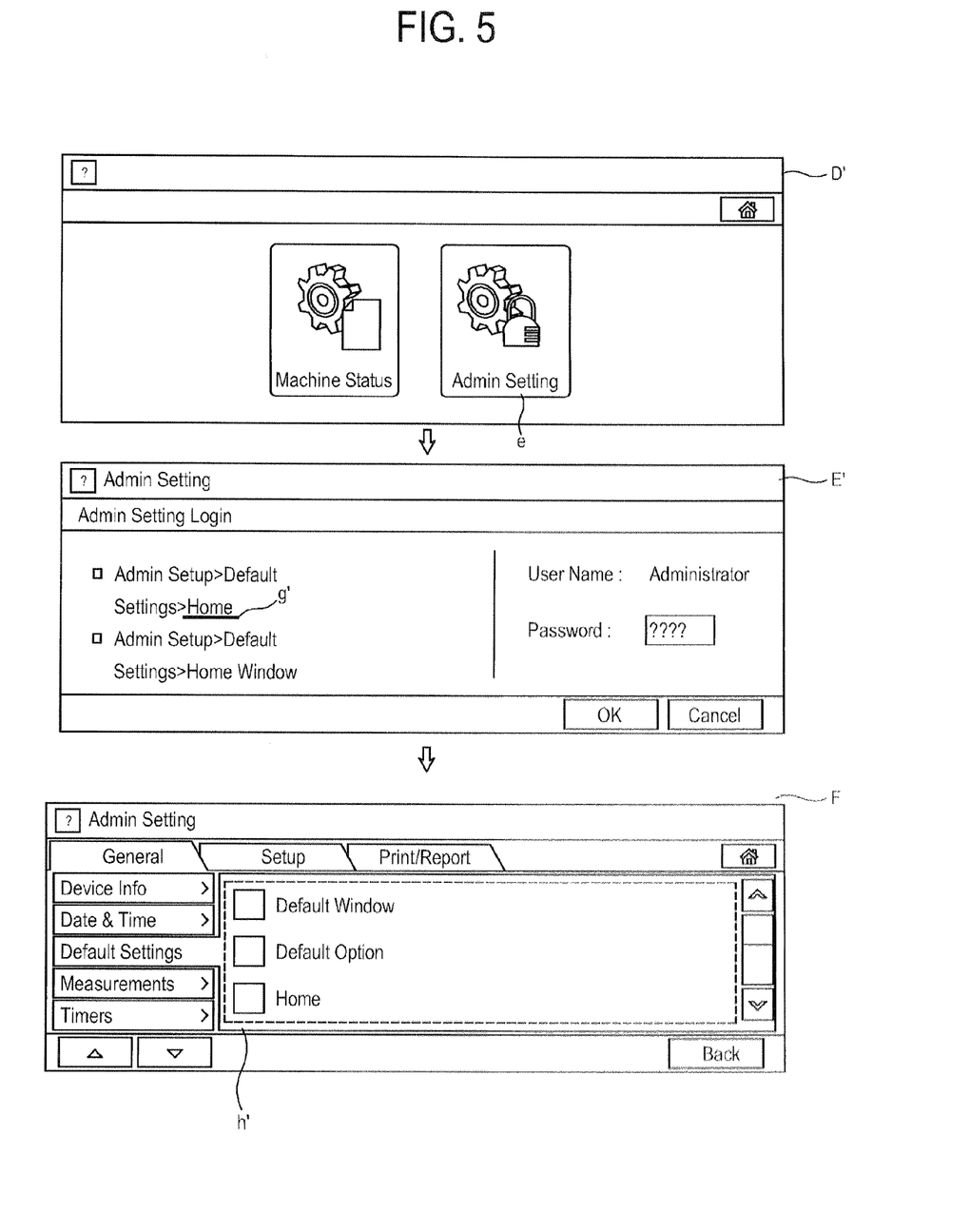
FIG. 5 illustrates an example of an image forming option setting process in the administrator setting according to another exemplary embodiment of the present general inventive concept.

FIG. 5 illustrates an example of searching the related image forming options if a user selects the administrator setting 123 of the input unit 120, instead of selecting the desired image forming function from the main UI A, while the main UI A is displayed.

Figure 6:
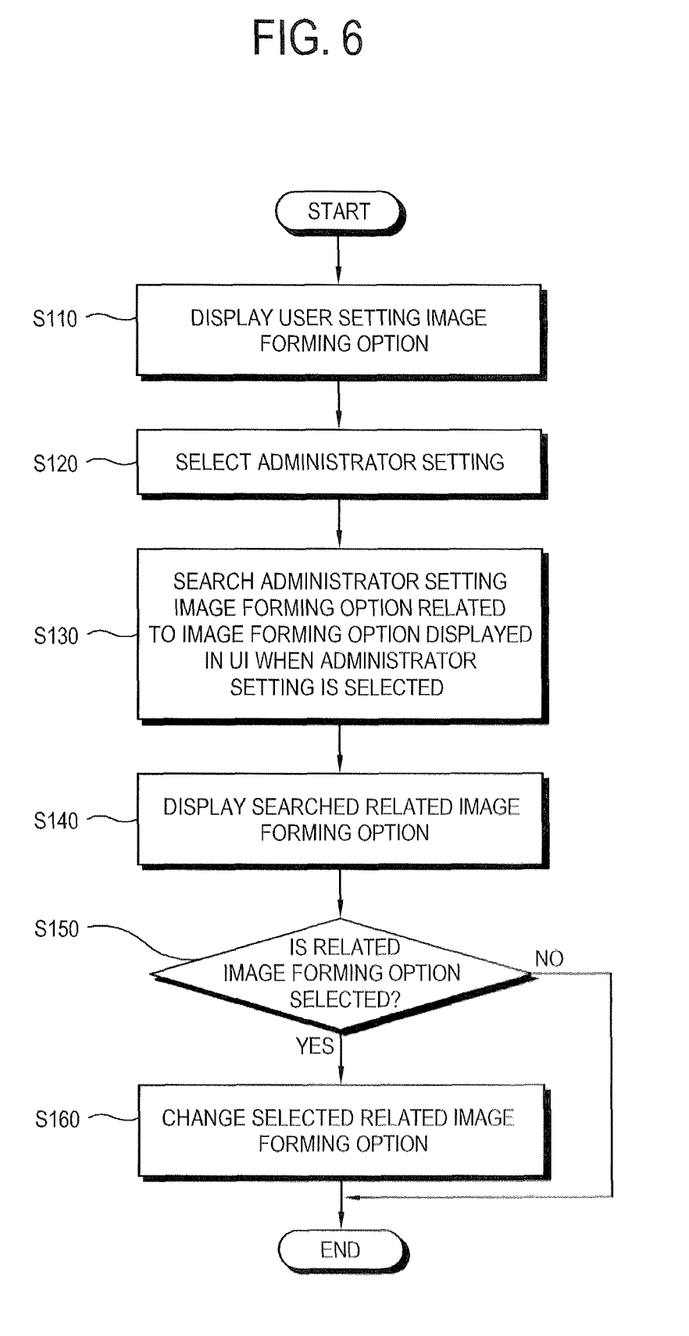
FIG. 6 is a flowchart illustrating an image forming option changing method according to an embodiment of the present general inventive concept.

Referring to FIGS. 1, 5 and 6, if a user selects the administrator setting 123 illustrated in FIG. 1 while the main UI A is currently displayed on the display unit 110, the controller 150 searches the image forming options related to the Default setting function in the main UI A. For example, the searched image forming option may be "Home" g' as displayed in another third UI E'. The controller 150 searches related image forming options with the "Home" g' in the another third UI E' and then controls the display unit 110 to display the search result which includes the searched related image forming options on the display unit 110 as illustrated in the fourth UI F.

A user may determine the desired image forming options through the related image forming options displayed in the fourth UI F (operation S150), and select the image forming options h' to be changed (operation S160). For example, in FIG. 5, the respective image forming options h' to be changed may be Default Window, Default Option and Home of the Default settings.

As described above, the image forming apparatus according to an embodiment of the present general inventive concept displays related image forming options based on user setting image forming options displayed on a display unit if an administer setting is selected, and improves user's inconvenience in going through complicated processes. Also, the image forming apparatus according to the present general inventive concept does not consider a hierarchical structure in searching the related image forming options, and determines the image forming options at different levels at the same time to reduce search time.

As described above, an image forming apparatus and an image forming option setting method thereof according to various embodiments of the present general inventive concept displays administrator setting image forming options related to image forming options selected by a user from a user setting, on a display unit, regardless of levels and categories and reduces inconveniences in setting the image forming options through various processes.

Also, the image forming apparatus and the image forming option setting method thereof according to various embodiments of the present general inventive concept displays related image forming options through correlation as well as through keywords included in the displayed user setting image forming options so that a user easily recognizes and changes the image forming options related to desired image forming options.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of setting an option of an image forming apparatus, the method comprising:

selecting an administrator setting while an image forming apparatus option, corresponding to a pre-selected function of the image forming apparatus and including at least one user setting option, is displayed by the image forming apparatus; and displaying an administrator setting option having a correlation with the displayed at least one user setting option according to the selected administrator setting, wherein the displayed administrator setting option is a first administrator setting option corresponding to a first function, when the displayed user setting option is related to the first function, wherein the displayed administrator setting option is a second administrator setting option corresponding to a second function, when the displayed user setting option is related to the second function.

2. The method according to claim 1, further comprising:
searching a plurality of administrator setting options to identify at least one administrator setting option correlating with the displayed option.

3. The method according to claim 2, further comprising:
displaying a setting environment of the identified at least one administrator setting option.

4. The method according to claim 3, further comprising:
selecting an option from the identified at least one administrator setting option; and
changing the displayed setting environment based on the selected option.

5. The method according to claim 2, wherein the searching a plurality of administrator setting options is based on a keyword included in the displayed option.

6. The method according to claim 2, wherein the searching a plurality of administrator setting options is based on a relevance to the displayed option.

7. The method according to claim 2, further comprising:
displaying the identified at least one administrator setting option together on a screen of a display unit.

8. The method according to claim 1, further comprising:
storing the plurality of administrator setting options according to a hierarchical structure,
wherein the administrator setting option is displayed irrespective of the hierarchical structure.

9. An image forming apparatus comprising:
a display unit to display a user setting option of the image forming apparatus;
a storage unit to store a plurality of user setting options and a plurality of administrator setting options; and
a controller to search, in response to an administrator setting selection while an image forming apparatus option, corresponding to a pre-selected function of the image forming apparatus and including at least one user setting option, is displayed, the plurality of administrator setting options to identify at least one administrator setting option having a correlation with the displayed user setting option and to control the display unit to display the identified at least one administrator setting option,
wherein the displayed administrator setting option is a first administrator setting option corresponding to a first function, when the displayed user setting option is related to the first function,
wherein the displayed administrator setting option is a second administrator setting option corresponding to a second function, when the displayed user setting option is related to the second function.

10. The image forming apparatus according to claim 9, wherein:
the storage unit further stores keywords of the plurality of user setting options and keywords of the plurality of the administrator setting options; and
the controller identifies the at least one administrator setting option based on keywords included in the displayed user setting option.

11. The image forming apparatus according to claim 9, wherein:
the storage unit further stores information of a correlation between the plurality of user setting options and the plurality of administrator setting options; and
the controller identifies the at least one administrator setting option based on a relevance to the displayed user setting option.

12. The image forming apparatus according to claim 9, wherein the controller controls the display unit to display the identified at least one administrator setting option together on a screen of the display unit.

13. The image forming apparatus according to claim 9, wherein the controller controls the display unit to display a setting environment of the identified at least one administrator setting option.

14. The image forming apparatus according to claim 13, wherein the controller further controls the display unit to change the displayed setting environment based on an option selected from the identified at least one administrator option.

15. An image forming apparatus, comprising:
a display unit to display a first user interface including at least one user setting option, corresponding to a pre-selected function of the image forming apparatus, and to display at least one other user interface; and
a controller to identify an option having a correlation with a selected one of the at least one user setting option of the displayed first user interface, to control the display unit to display the identified option through the at least one other user interface, and to control the display unit to display simultaneously the first user interface and the at least one other user interface on a screen of the display unit,
wherein the displayed administrator setting option is a first administrator setting option corresponding to a first function, when the displayed user setting option is related to the first function,
wherein the displayed administrator setting option is a second administrator setting option corresponding to a second function, when the displayed user setting option is related to the second function.

16. An image forming apparatus, comprising:
a display unit to display a first user interface including at least one user setting option, corresponding to a pre-selected function of the image forming apparatus, and to display at least one other user interface; and
a controller to identify an option having a correlation with a selected one of the at least one user setting option of the displayed first user interface, to control the display unit to display the identified option through the at least one other user interface, and to control the display unit to display, irrespective of a hierarchical structure, both the first user interface and the at least one other user interface on a screen of the display unit,
wherein the displayed administrator setting option is a first administrator setting option corresponding to a first function, when the displayed user setting option is related to the first function,
wherein the displayed administrator setting option is a second administrator setting option corresponding to a second function, when the displayed user setting option is related to the second function.

17. A control method of an image forming apparatus, the control method comprising:
displaying on a display unit a first user interface and at least one other user interface, the first user interface including at least one user setting option corresponding to a pre-selected function of the image forming apparatus;
identifying an option having a correlation with a selected one of the at least one user setting option of the displayed first user interface; and
controlling the display unit to display the identified option through the at least one other user interface such that the first user interface and the at least one other user interface are displayed simultaneously,
wherein the displayed administrator setting option is a first administrator setting option corresponding to a first function, when the displayed user setting option is related to the first function,
wherein the displayed administrator setting option is a second administrator setting option corresponding to a second function, when the displayed user setting option is related to the second function.

18. A non-transitory, computer-readable recording medium having embodied thereon a computer program, executable by a computer, to execute a method, wherein the method comprises:
displaying on a display unit a first user interface and at least one other user interface, the first user interface including at least one user setting option corresponding to a pre-selected function of the image forming apparatus;
identifying an option having a correlation with a selected one of the at least one user setting option of the displayed first user interface; and
controlling the display unit to display the identified option through the at least one other user interface such that the first user interface and the at least one other user interface are displayed simultaneously,
wherein the displayed administrator setting option is a first administrator setting option corresponding to a first function, when the displayed user setting option is related to the first function,
wherein the displayed administrator setting option is a second administrator setting option corresponding to a second function, when the displayed user setting option is related to the second function.

19. A display device, comprising:
a display unit to display an option of a multifunction apparatus;
a storage unit to store a plurality of administrator setting options; and
a controller to search, in response to an administrator setting selection while a multifunctional apparatus option corresponding to a pre-selected function of the multifunction apparatus and including at least one user setting option, is displayed, the plurality of administrator setting options to identify at least one administrator setting option having a correlation with the displayed option and to control the display unit to display a setting environment of the identified at least one administrator setting option,
wherein the at least one administrator setting option is displayed as a first administrator setting option corresponding to a first function, when the displayed user setting option is related to the first function,
wherein the at least one administrator setting option is displayed as a second administrator setting option corresponding to a second function, when the displayed user setting option is related to the second function.

* * * * *